(12) United States Patent
Hsu

(10) Patent No.: US 6,747,867 B2
(45) Date of Patent: Jun. 8, 2004

(54) ELEVATED AND LOWER KEYBOARD APPARATUS

(75) Inventor: Chien-Shih Hsu, Taipei (TW)

(73) Assignee: Darfon Electronics Corp., TaoYuan (TW)

( * ) Notice: Subject to any disclaimer, the term of this patent is extended or adjusted under 35 U.S.C. 154(b) by 0 days.

(21) Appl. No.: 10/001,789

(22) Filed: Dec. 5, 2001

(65) Prior Publication Data

US 2002/0071245 A1 Jun. 13, 2002

(30) Foreign Application Priority Data

Dec. 8, 2000 (TW) ...................................... 89221559 U

(51) Int. Cl.$^7$ ................................................ G06F 1/16
(52) U.S. Cl. ....................... 361/680; 400/682; 200/5 A; 361/681; 361/682
(58) Field of Search ........................ 361/680; 400/682; 200/5 A, 3.44

(56) References Cited

U.S. PATENT DOCUMENTS

| | | | | |
|---|---|---|---|---|
| 5,532,904 A | * | 7/1996 | Sellers | 361/680 |
| 5,602,715 A | * | 2/1997 | Lempicki et al. | 361/680 |
| 5,793,605 A | * | 8/1998 | Sellers | 361/680 |
| 5,874,696 A | * | 2/1999 | Hayashi et al. | 200/5 A |
| 6,137,676 A | * | 10/2000 | Merkel | 361/680 |
| 6,172,868 B1 | * | 1/2001 | Oura | 361/680 |

\* cited by examiner

*Primary Examiner*—Darren Schuberg
*Assistant Examiner*—Anthony Q. Edwards
(74) *Attorney, Agent, or Firm*—Troxell Law Office PLLC

(57) ABSTRACT

An elevated and lower and lower keyboard apparatus comprises a base, plural of key-top-lids, plural of scissors-devices and a guiding board. The scissors-device comprises a first connection rod and a second connection rod, which are intersected to form a turning scissors configuration, which is arranged between the base and the key-top-lid. Through the confinement of the scissors-device, the key-top-lid may make a rise-up and lower-down motion relatively to the base. In a movable manner, the guiding board is arranged on the base to process a movement between a first position and a second position. Relative to the plural of scissors-devices, there are plural of guiding blocks formed on the guiding board. When the guiding board moves from the second position to the first position, the guiding block presses upon the second connection rod and makes the second connection rod move closely to the base, and further, relatively to the base, it makes key-top-lid lowering down. When the guiding block moves from the first position to the second position, through an elastic body, it can rise up the key top-lid relatively to the base.

11 Claims, 7 Drawing Sheets

ELEVATED AND LOWER KEYBOARD APPARATUS

FIELD OF THE INVENTION

The present invention relates to an elevated device, especially a structure for a keyboard of a notebook computer, and by which a movement of a guiding board lowers the height of the keyboard to reach a state of storage.

BACKGROUND OF THE INVENTION

In the prior art of a keyboard of a notebook computer, the key of the keyboard is usually constructed on a rubber and a relative circuit with touching and controlling functions (following is simply called circuits) by a scissors type of structure. FIG. 1 shows the structure of single key, wherein the key 1 is arranged on a base 10, and in which comprises the key-top-lid 11 provided for directly knocking and the scissors-device 12 provided for rising and lowering the key-top-lid 11. This scissors-device 12 is designed by the intersection of a pair of connection rods to form a turning scissors configuration. Between the two connection rods of the scissors-device 12 and under the key-top-lid 11, there is a formation of a containing space, which provides an installation of the elastic rubber 13 for provision of recovery force of the pressing. The elastic rubber 13 has a hollow portion, and there is a corresponding circuit contact disposed on the base 10 where under the hollow portion of the elastic rubber 13 (not shown).

In the following explanation, with respect to the illustration of the key 1 and the symmetrical scissors-device 12, only shows a side view with the connection rod of its single side, and the elastic rubber 13 and relative circuits are omitted. In the different figures, the same reference number and name will represent an element in the same position, and the simple drawing will facilitate the proceeding of clarification of the written explanation.

Please refer to FIG. 2, there is an illustration of the sectional structure of a prior art scissoring key structure, wherein the scissors-device 12 is constructed between the internal surface 110 of the key-top-lid 11 and the base 10. The scissors-device 12 comprises a first connection rod 121 and a second connection rod 122. The first connection road 121 and the second connection rod 122 are pivoting jointed on a pivot point 123 of their middle sections to form an intersection structure which can be a relatively turning scissors structure. On the installation of the first connection rod 121, the first upper end 1211 and the flange 1101 of the extension of the internal surface 110 of the key-top-lid 11 form a turning, pivoting joint match. Relative to the first upper end 1211 of the first connection rod 121, the first lower end 1212 and the third flange 101 extended from the base 10 form a slidably and pivotally sliding match. On the installation of the second connection rod 122, the second upper end 1221 and the second flange 1102 of the extension of the internal surface 110 of the key-top-lid 11 form a glideably and turning match. Relative to the second upper end 1221 of the second rod 122, the lower second end 1222 and the fourth flange 102 extended from the base 10 forms a turning pivoting joint match.

In the illustration of FIG. 2 of the prior art scissors key structure, the first connection rod 121 and the second connection rod 122 form a balancing scissors elevating structure (namely, the scissors-device 12). The key-top-lid 11 is an application end. Both ends of each connection rod (the first connection rod 121 or the second connection rod 122) and the framework (i.e. key-top-lid 11 and base 10) separately form a turning, pivoting joint match, and a gliding, pivoting match. With these, during the operation of pressing key, it may keep a side of the scissors-device 12 (including one side of the first upper end 1211 and the second lower end 1222) in one substantially vertical line L, and the another side (including one side of the second upper end 1221 and the first lower end 1212) processes the up and down of the horizontally movement by the excessive travel of the gliding match.

Due to the continuous improvement of today's technology, the electronic product is developed rapidly. Anything concerning to electronic relative product must be required with the properties of shortness, smallness, lightness, thinness and convenience of carry. Therefore, the above-mentioned keyboard structure still belongs to an acceptable range for the application of desktop personal computer. But when applying in the portable notebook computer, the mentioned keyboard structure is a big barrier of the reducing the thickness of a computer. Relatively, it will make that the volume of the portable notebook is too big to carried easily, and contradict the idea of requirement of shortness, smallness, lightness and thinness of the electronic product, therefore, the breakthrough of this technological barrier is the most urgent.

SUMMARY OF THE INVENTION

The major object of this invention is to provide an elevated and lower keyboard apparatus, by a horizontal movement of a guiding board to make a key structure vertically rising up and lowering down and to reach the function of lowering down the keyboard apparatus.

The another object of this invention is to provide an elevated and lower keyboard apparatus, by a horizontal movement of a guiding board to make the key structure vertically rising up and lowering down and to accomplish a keyboard device of a notebook computer having an application state and a storage state in different heights of keyboard for facilitating the necessity of reducing the thickness of a notebook.

To reach the above-mentioned objects, the elevated and lower keyboard apparatus of this invention comprises a base, plural of key-top-lids, plural of scissors-devices and a guiding board.

The scissors-devices comprise a first scissors-device and a second scissors-device. The first scissors-device has a first connection rod and a second connection rod, and the two connection rods are intersected to form a turning scissors configuration. The two ends of the first scissors-device are separately connected to the base and the first key-top-lid. The first key-top-lid is moved in upward and downward manner relatively to the base by the first scissors-device.

The second scissors-device has a third connection rod and a fourth connection rod. The two connection rods are intersected to form a turning scissors configuration. The two ends of the second scissors-device are separately connected to the base and the second key-top-lid. The second key-top-lid is moved in upward and downward manner relatively to the base by the second scissors-device.

The guiding board is disposed on the base and moved between a first position and a second position. There are a first guiding block and a second guiding block formed on the guiding board. When the guiding board is moved from the second position to the first position, the first guiding block and the second guiding block separately press the second connection rod and the fourth connection rod to make the first key-top-lid and second key-top-lid lowering down relatively to the base. When the guiding board is moved from the first position to the second position, the first guiding block and the second guiding block separately releases the second connection rod and the fourth connection rod to make the first key-top-lid and the second key-top-lid rising up relatively to the base.

Another embodiment of this invention is an application on a keyboard apparatus of a notebook computer. The notebook computer comprises a main body part and a screen part, and the screen part is pivotally connected and covered on the main body part. The keyboard apparatus is disposed inside the main body part, which comprises a base, plural of key-top-lids, plural of scissors-devices, a guiding board and at least one operation part.

The scissors-devices comprise a first scissors-device and a second scissors-device. The first scissors-device has a first connection rod and a second connection rod, and the two connection rods are intersected to form a turning scissors configuration. The two ends of the first scissors-device are separately connected to the base and the first key-top-lid. The first key-top-lid is moved in upward and downward manner relatively to the base by the first scissors-device.

The second scissors-device has a third connection rod and a fourth connection rod. The two connection rods are intersected to form a turning scissors configuration. The two ends of the second scissors-device are separately connected to the base and the second key-top-lid. The second key-top-lid is moved in upward and downward manner relatively to the base by the second scissors-device.

The guiding board is disposed on the base and moved between a first position and a second position. There are a first guiding block and a second guiding block formed on the guiding board. When the guiding board is moved from the second position to the first position, the first guiding block and the second guiding block separately presses the second connection rod and the fourth connection rod to make the first key-top-lid and the second key-top-lid lowering down relatively to the base. When the guiding board is moved from the first position to the second position, the first guiding block and the second guiding block separately releases the second connection rod and the fourth connection rod to make the first key-top-lid and the second key-top-lid rising up relatively to the base.

The operation part is connected to the guiding board to make the guiding board moved horizontally relative to the base. Preferable for the operation part, when the screen part and the main body part are in a closed state, the operation part moves the guiding board to the first position. When the screen part is pivotally lifted up from the main body part, the operation part makes the guiding board moved to the second position.

BRIEF DESCRIPTION OF DRAWINGS

The invention, as well as its many advantages, may be further understood by the following detailed description and drawings in which.

DETAILED DESCRIPTION OF THE PREFERRED EMBODIMENT

Figure 1:
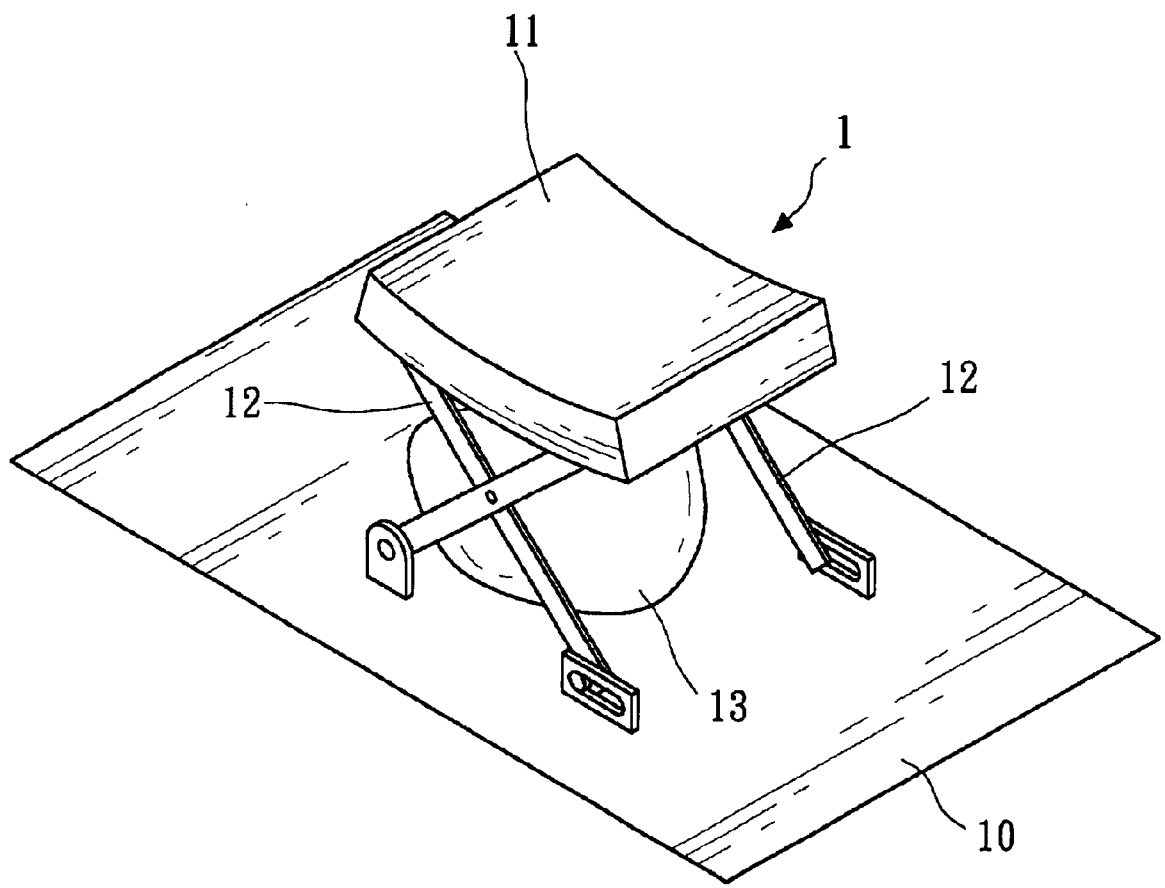
FIG. 1 is an illustration for a three-dimensional structure of a prior art scissors key.
Figure 2:
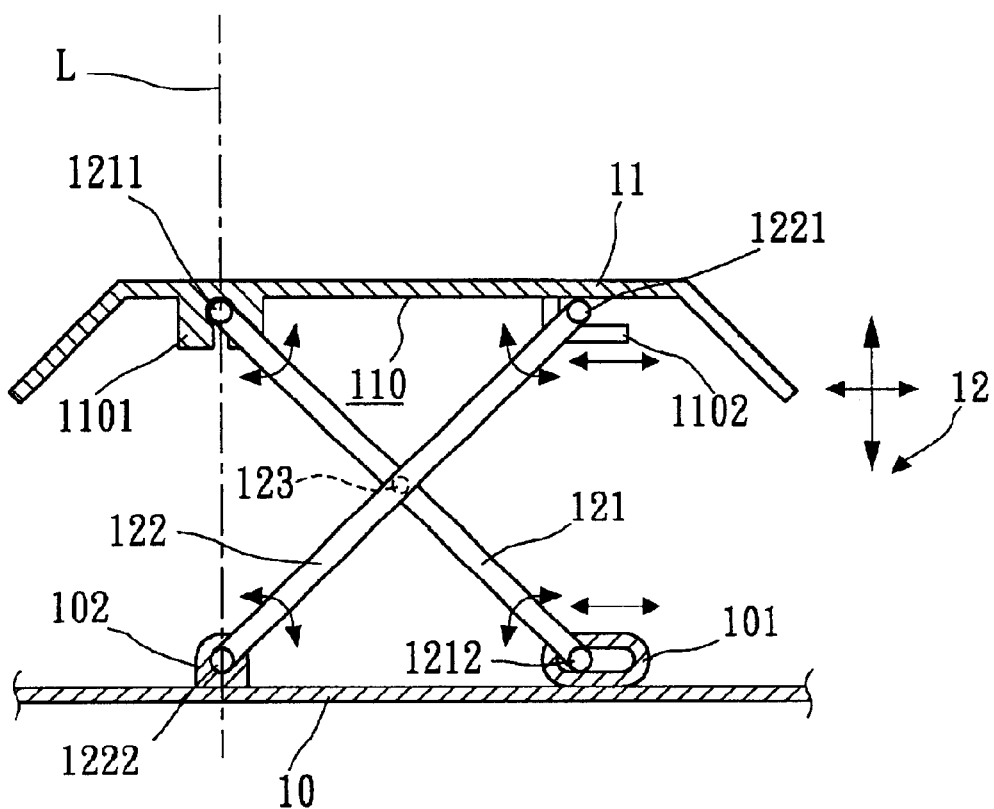
FIG. 2 is an illustration for a section structure of a prior art scissors key.
Figure 3:
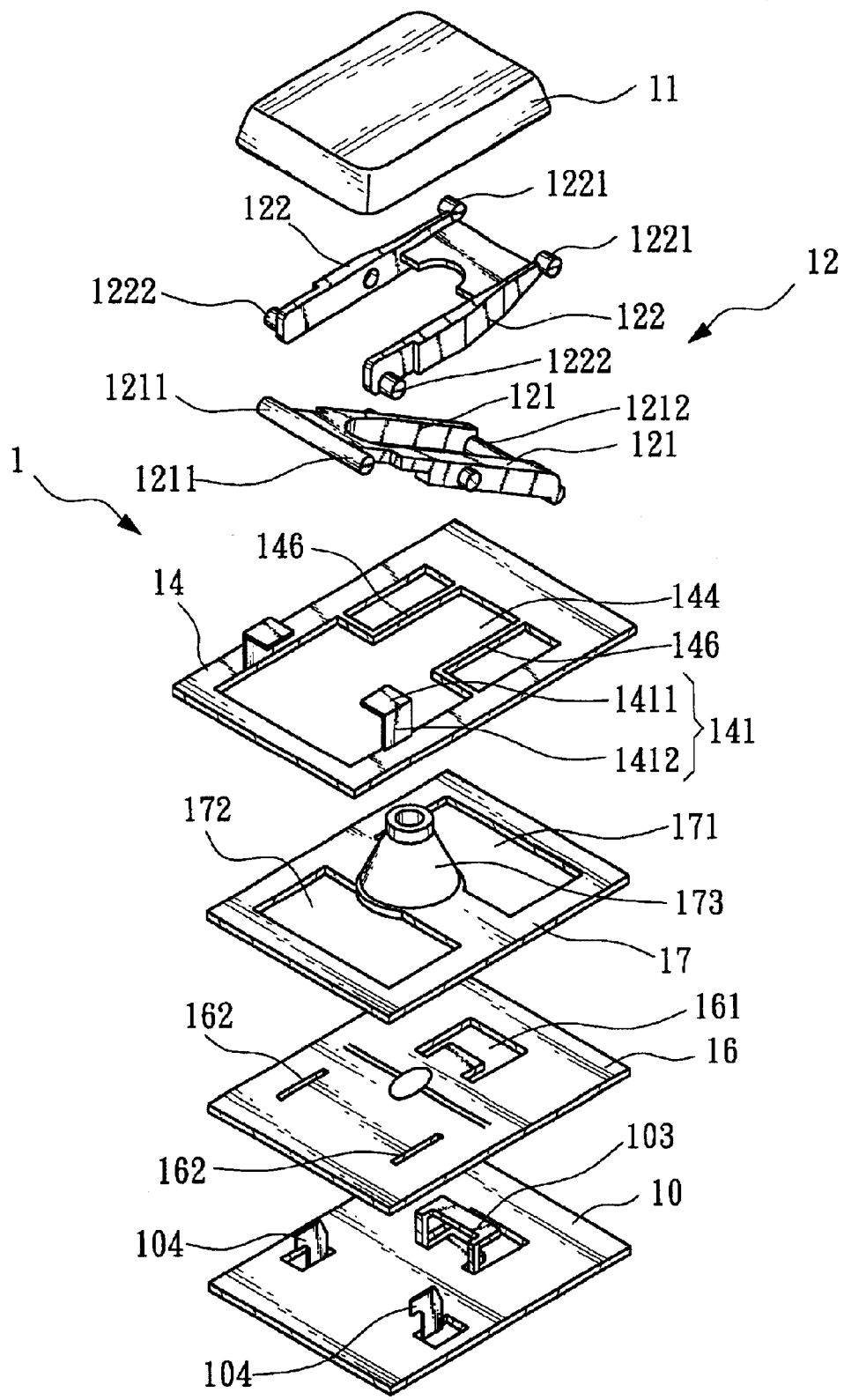
FIG. 3 is an illustration for the preferable embodiment of the key structure of the elevated and lower keyboard apparatus of this invention.

In the prior art of a computer keyboard, the key on the keyboard is usually constructed on a rubber and relative circuit by a key structure of a scissors type. Please refer to FIG. 3, it is an illustration for a three-dimensional structure of the preferable embodiment of the elevated and lower key structure of the invention. To facilitate the explanation, a single key structure will be described.

In the key 1, which comprises a base 10, on which a tenon 103 and at least one leg-base 104 are formed; a flexible printed circuit board 16, installed on the base 10, in which a mortise 161 is formed relatively to the tenon 103 and at least one leg-base opening trough 162 is formed relatively to the leg-base 104; an elastic layer 17, on which a bowel-shaped elastic body 173, a mortise opening 171 relative to a tenon, and a leg-base opening 172 relative to the leg-base 104 are formed. In the preferable embodiment, there are two leg-bases 104 and two leg-base opening troughs 162, while the two leg-bases 104 can be placed through the leg-base opening 172; a guiding board 14, on which at least one guiding block 141 and one open trough 144 are formed, two limited stop-blocks 146 are installed in the opening trough 144; a key-top-lid 11 provided for the directly knocking by user; and a scissors-device 12 provided for the elevation of the key-top-lid 11. In this invention, the tenon 103 and two leg-bases 104 formed on the base 10 are passing through the openings relative to the flexible printed circuit board 16 and the elastic layer 17, and protruding out the opening trough 144 of the guiding board 14. The scissors-device 12, applied as a pair of connection rod device, comprises two first connection rods 121 and two second connection rods 122. So, there are four ends (two first upper ends 1211 and two second upper ends 1221) connected with the key-top-lid 11, and other three ends (one first lower end 1212 and two second lower ends 1222) are connected with the tenon 103 and leg-bases 104 of the base 10. The two sides of the first lower end 1212 contact against the limited stop-block 146 to avoid the separation of the guiding board 14 and the elastic layer 17. The key-top-lid 11 is moved in upward and downward manner relative to the base 10 by the scissors-device 12. But for a preferable application on the device, it also may separate any two connected common ends into two symmetrical ends or connect two symmetrical ends into a common end, i.e. connecting the two second lower ends 1222 into one common lower end. The applications of such device variation are well known for the persons who are familiar with that technology and also do not exceed the range of the patent structure of this invention, so they are not described repeatedly here.

The guiding board 14 is installed between the base 10 and the key-top-lid 11. In the preferable embodiment of this invention, by a way of being able to move horizontally, the guiding board 14 is installed on the base 10 in a substantially horizontal movement manner. The guiding block 141 is installed on the guiding board 14. The guiding block 141 is an inverted L-shaped structure, which consisted of an upper lid 1411 that is parallel to the guiding board 14 and a side lid 1412, which is connected vertically with the guiding board 14. The lower ends of the scissors-device 12 are connected with the tenon 103 and the leg-bases 104, which pass through the opening trough 144. The guiding block 141 moves simultaneously with the movement of the guiding board 14.

Figure 4A:
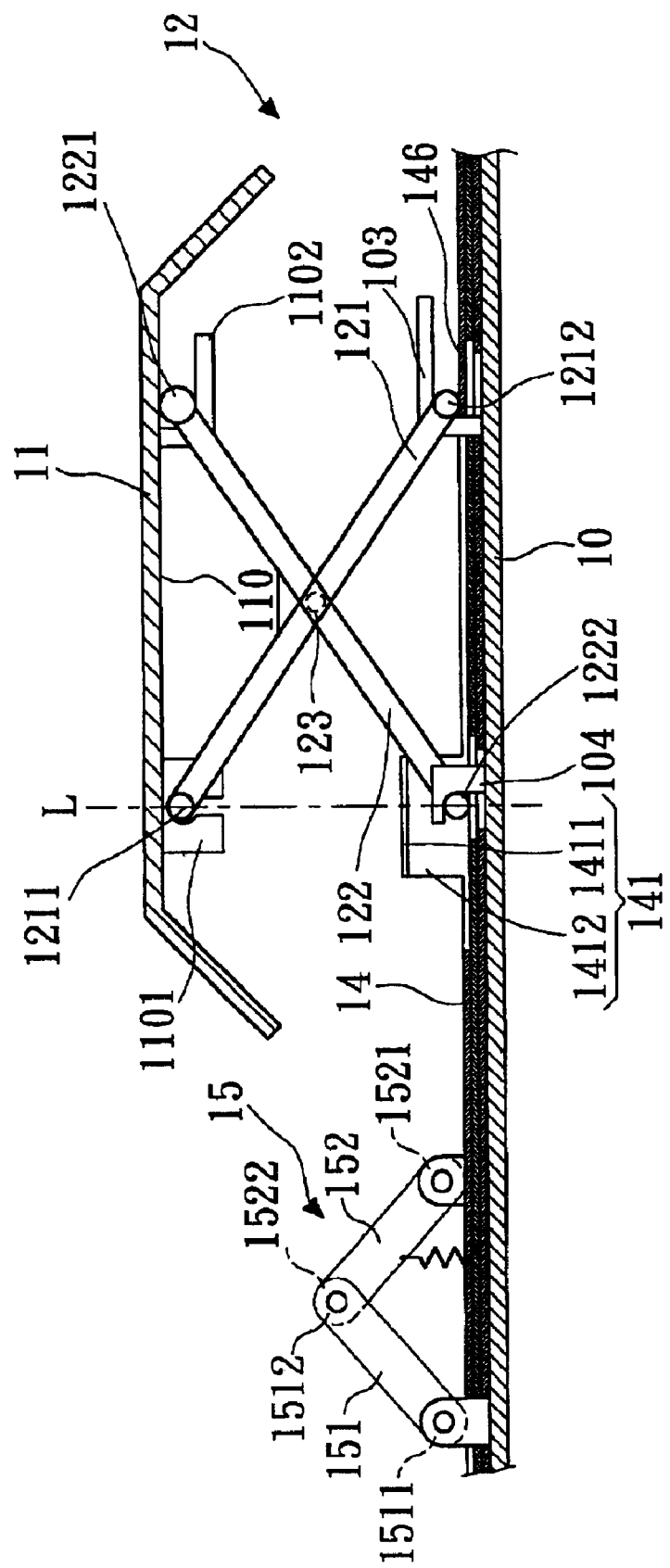
FIG. 4(A) is an illustration for the section view of the FIG. 3 as the guiding board positioned in the second position.
Figure 4B:
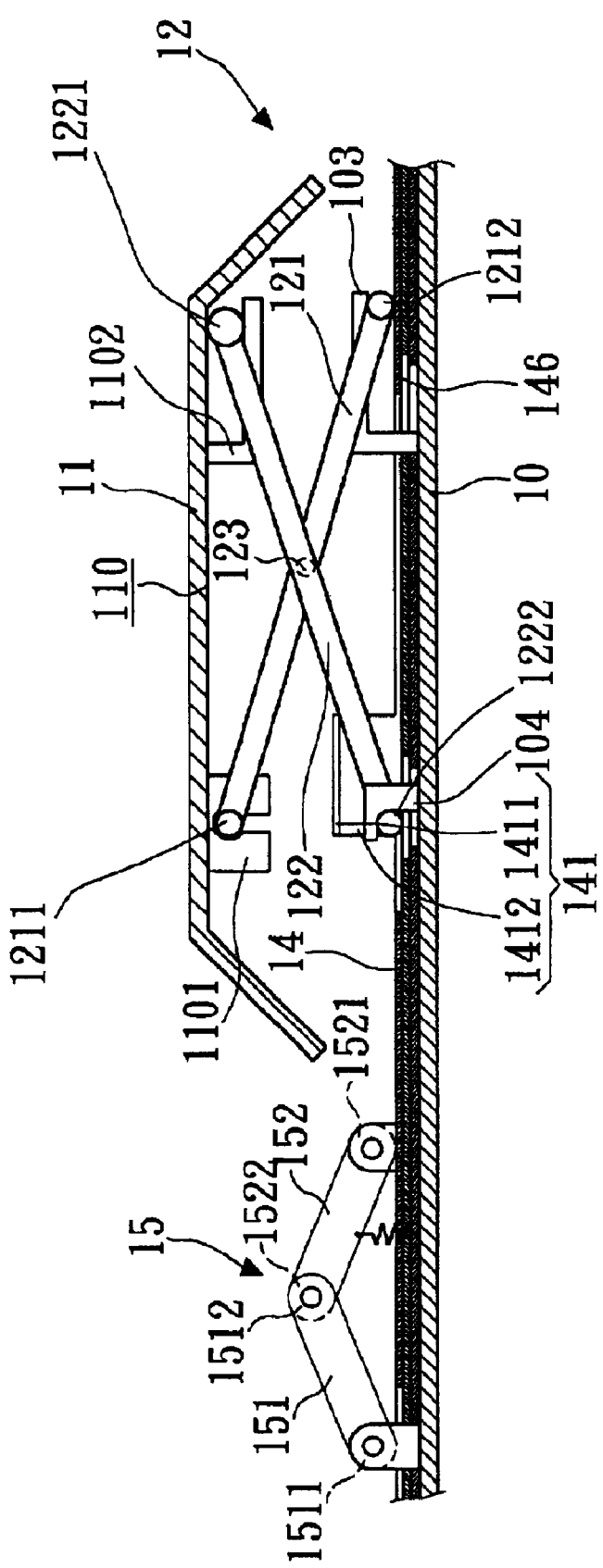
FIG. 4(B) is an illustration for the section view of FIG. 3 as the guiding board positioned in the first position.

Please refer to FIG. 4(A) and FIG. 4(B), which are the section illustrations as the guiding board located at the second position and the first position. The scissors-device 12 is constructed between a bottom surface 110 of the key-top-lid 11 and the base 10. The scissors-device 12 comprises a first connection rod 121 and a second connection rod 122. The first connection road 121 and the second connection rod 122 are intersected to form a turning scissors structure on a pivot point 123 of their middle sections. On the framework of the first connection rod 121, the first upper end 1211 and the flange 1101 of the extension of the bottom surface 110 of the key-top-lid 11 form a turning, pivoting joint match. Relative to the first upper end 1211, the first lower end 1212 and the tenon 103 of the extension of the base 10 form a slidably and turnably match. On the framework of the second connection rod 122, the second upper end 1221 and the second flange 1102 of the extension of the bottom surface 110 of the key-top-lid 11 form a gliding and turning match. Relative to the second upper end 1221, the lower second end 1222 and the leg-base 104 of the extension of the base 10 form a turning and pivoting joint match.

In the key structure of the elevated and lower keyboard apparatus of this invention, the first connection rod 121 and the pivoting jointed second connection rod 122 form a balancing scissors elevating structure (namely, the scissors-device 12). The key-top-lid 11 is an applying force end. Both ends of each connection rod (the first connection rod 121 or the second connection rod 122) and the framework (i.e. key-top-lid 11 and base 10) separately form a turning, pivoting joint match, and a gliding, pivoting match. With these, during the operation of pressing key, it may keep a side of the scissors-device 12 (including one side of the first upper end 1211 and the second lower end 1222) in one substantially vertical line L, and the another side (including one side of the second upper end 1221 and the first lower end 1212) processes the up and down elevation of the horizontally biased movement by the excessive travel of the gliding match.

Wherein, a guiding board 14 is further installed between the base 10 and the key-top-lid 11. The guiding board 14 has the plural of opening troughs 144, which are installed by way of a predetermined arrangement. The opening trough 144 has at least one guiding block 141 formed on its side edge. The guiding block 141 is positioned between the base 10 and the pivoting jointed point 123 and corresponding to the second connection rod 122. The scissors-device 12 passes through the opening trough 144 and elongates toward to the direction of the key-top-lid 11. The guiding board 14 is horizontally moved relative to the base 10. When the guiding board 14 is moved, the guiding block 141 of the inverted L-shaped structure is moved corresponding to the movement of the guiding board 14 by the side-lid 1412, which is vertically connected to the guiding board 14.

Wherein, an elastic material may make the guiding block. When the guiding block pressed upon the second connection rod, the guiding block will be slightly floated by the second connection rod in order to increase an arm and reduce a force, which applied on the guiding block.

Wherein, when the guiding board 14 is horizontally moved on the base 10, namely from the movement of FIG. 4(A) to the situation of FIG. 4(B), the upper lid 1411 (parallel to the guiding board 14) of the guiding block 141 is moved horizontally and contacts gradually with the second rod 122. Because the upper lid 1411 completely transfers a horizontal action force of the horizontal motion, after contacting with the second connection rod 122, the upper lid 144 then presses down the second connection rod 122. The second lower end 1222 of the second connection rod 122 and the leg-base 104 extended from the base 10 form a turning, pivoting joint match. The second end 1222 becomes a rotational axis and makes the second connection rod 122 rotating around the rotational axis and approaching the base 10. The second upper end 1221 of the second connection rod 122 and the second flange 1102 extended from the key-top-lid 11 form a rotational gliding, rotating match. After the interaction with the second flange 1102, the second upper end 1221 then moves the key-top-lid 11 and makes the key-top-lid lowering down relatively to the base 10. Because the guiding block 141 applies a force on the second connection rod 122 with a horizontal motion, when the second connection rod 122 more approaches to the horizontal direction, the horizontal component force of the horizontal applying force forwarded by the upper lid 1411 can make the second connection rod 122 absorbing more the horizontal component force, and reach the function of accomplishment of the horizontal movement and press with small force applied by the guiding board 14.

When the movement is from FIG. 4(B) to FIG. 4(A), the guiding block 141 releases the second connection rod 122, while the scissors-device 12 breaks away the action of the force in the horizontal direction, so the key-top-lid 11 is acted solely by the upper, elastic force from the rubber elastic body 13 in vertical direction to make the key-top-lid 11 rising up relatively to the base 10.

Wherein, the elevated and lower keyboard apparatus further comprises at least one operation part 15. The operation part 15 has a first support frame 151, a second support frame 152 and an elastic element 153. The first support frame 151 has a first end 1511, which is pivoting connected with the base 10. The second support frame 152 has a first end 1521, which is pivoting connected with the guiding board 14. The first support frame 151 has a second end 1512, which is connected with a second end 1522 of the second support frame 152. One end of the elastic element 153 is installed in a predetermined position of the operation part 15 and the another end is pressed against the base 10. When a force is acting on the operation part 15, the elastic element 153 is pressed down by the force, and the operation part 15 takes the first end 1511 (connected with the base 10) of the first support frame 151 as a fixed point, and the first end 1521 of the second support frame 152 moves toward the horizontal direction by the action of the force, makes the guiding board 14 moving from the second position to the first position. When the force is removed, an elastic force of the elastic element 153 lifts up the operation part 15 to make the guiding board 14 moving from the first position to the second position for accomplishing the change of motion for both FIG. 4(A) and FIG. 4(B).

Figure 5:
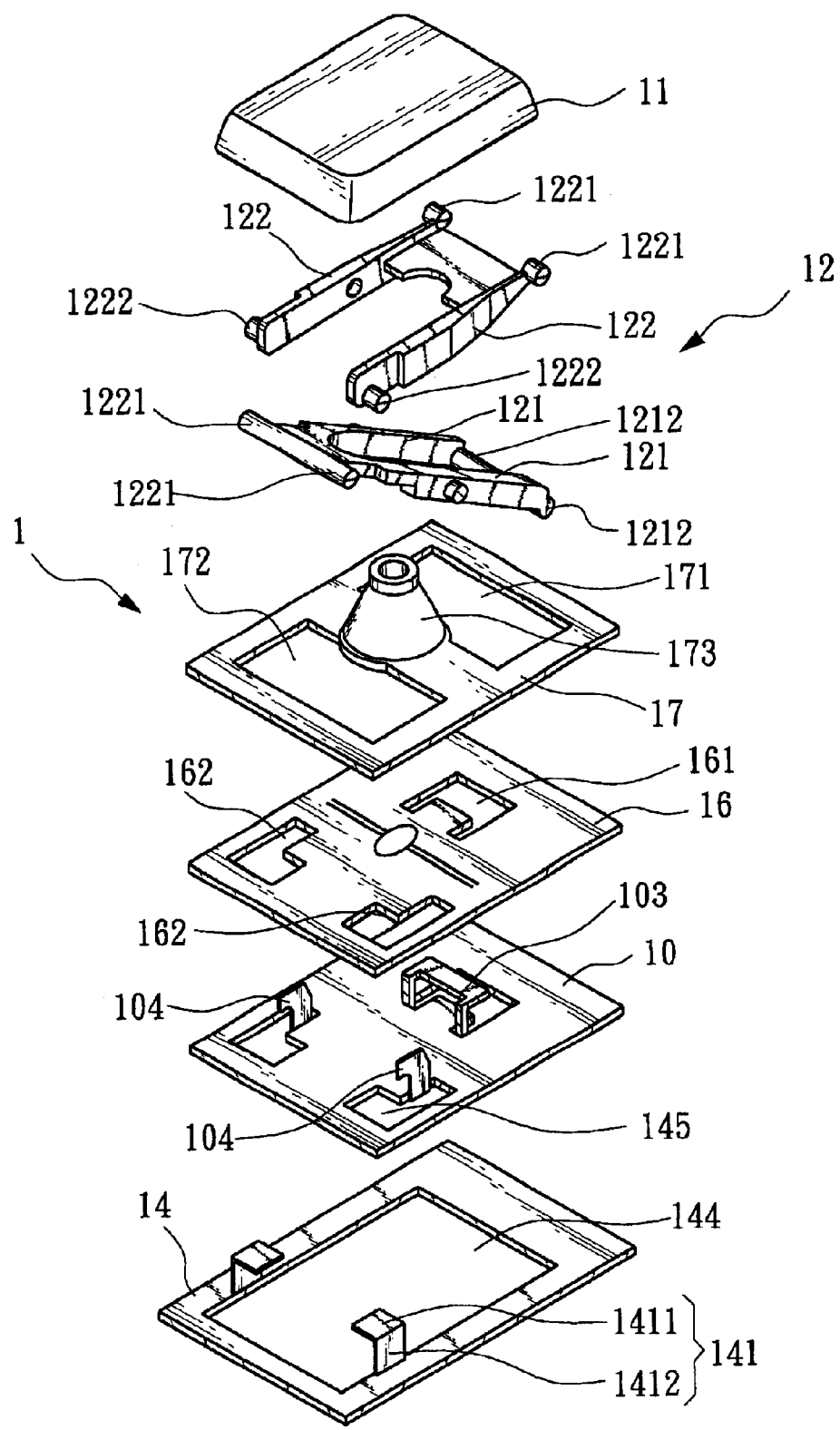
FIG. 5 is an illustration for a three-dimensional structure of an another preferable embodiment of the key structure of the elevated and lower keyboard apparatus of this invention.

However, another preferable embodiment of this invention is that the guiding board 14 may be installed under the base 10. Please refer to FIG. 5, which is an illustration for a three-dimensional structure of an another preferable embodiment of the key structure of the elevated and lower keyboard apparatus of this invention. Wherein, the guiding board 14 is installed under the base 10. The guiding block 141 is formed on the guiding board 14. An opening 145 is formed on a relative position of the base 10. The guiding block 141 passes through the opening 145 and protrudes upward to the base 10. When the guiding board 14 is moved, the guiding block 141 of the inverted L-shaped structure is moved corresponding to the movement of the guiding board 14 for pressing or releasing the connection rods of the scissors-device 12 by the side lid 1412 which is vertically connected with the guiding board 14.

When the guiding board 14 is moved horizontally, the guiding block 141 in corresponding to the movement of the guiding board 14 presses upon the second connection rod 122 and makes the key-top-lid 11 lowering down relatively to the base 10. When the guiding block 141 releases the second connection rod 122, it makes the key-top-lid 11 rising up relatively to the base 10. The applications of such kind device variation are well known for the persons who are familiar with such technology and also do not exceed the range of the patent structure of this invention, so they are not described repeatedly here.

In this invention, the above-mentioned structure of the base 10 is an illustration of a single plate-shaped structure. However, in the practical application, the base 10 also could be a compound base 10. The so-called compound base is constituted by a non-single structure, but it also could be a plate-superposition, chuck-placing, add-placing etc., or the installed platform of the scissors-device 12 of the key structure constituted by other methods. For example, in the U.S. Pat. Nos. 5,463,195 and 5,399,822, the formation of the base adopts the construction methods of add-placing and superposition. The variation of the construction method of a base is well known for the persons who are familiar with such technology, so any change of the structure of the base still does not exceed the field of the definition of the base of this invention.

In the mentioned description of this invention, the elevated and lower keyboard apparatus is applied on the connection structure of the second connection rod 122 and the base 10. However, in practical application, under an appropriate modification, the elevated and lower keyboard apparatus may be applied on the connection structure of the first connection rod 121 and the base 10. However, such kind modification belongs to an easy application for the persons who are familiar with such kind technology according to the mentioned description of this invention, so this kind modification still does not exceed the field of the technology of this invention.

Figure 6:
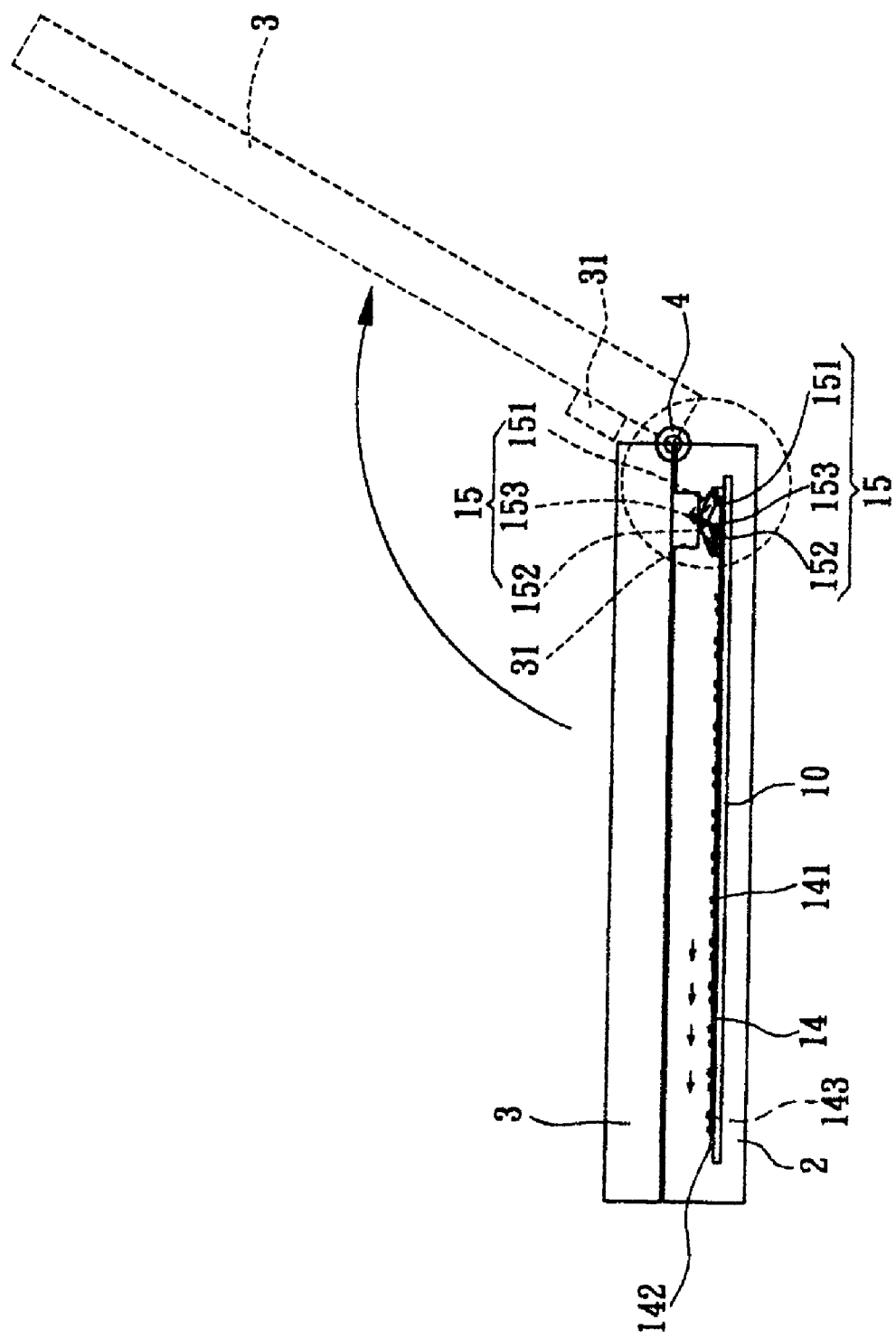
FIG. 6 is a motion illustration for another preferable embodiment of the keyboard apparatus of a notebook computer of the key structure of the elevated and lower keyboard apparatus of this invention.

FIG. 6 is another preferable embodiment for the motion of the keyboard apparatus of a notebook computer of the key structure of the elevated and lower keyboard apparatus of this invention. The key part of the keyboard is same as the key structure of the above-mentioned elevated and lower keyboard apparatus, so it does not repeatedly describe here. The notebook computer has a main body part 2 and a screen part 3 which is pivotally connected and covered on the main body part 2 through a pivotal structure 4. The keyboard apparatus is installed inside the main body part 2. The main body part 2 further comprises an operation part 15, which is movably connected with the guiding board 14 and may allow the users apply force for direct operation, it makes the guiding board 14 moving along horizontal direction relatively to the base 10.

The operation part 15 comprises an active end 151, a passive end 152 and an elastic element 153. The active end 151 is connected onto the screen part 3 of the notebook computer and the screen part 3 is with a press button 31, while the passive end 152 is connected to the guiding board 14 of the main body part 2 of the notebook computer. When the screen part 3 and the main body part 2 are in a closing state (shown with the actual line), the passive end 152 pushes the guiding board toward the first position 142 and makes the key structure under a lower position. By way of the reduction of height of the key structure, reaching the object of lowering the height of the main body part. When the screen part 3 is pivotally lifted up from the main body part 2 (shown with the broken line), it can connect and move the operation part 15, and make the passive end 152 drives the guiding board 14 moving horizontally to the second position 143 simultaneously, and then the key structure is in the higher position. Through this, it makes the notebook computer has a more jutting out keyboard structure when in operation state.

In the mentioned structure, the press button 31 is constituted with the method of press block. In the other embodiments, the press button 31 can be formed as a cam structure installed inside the screen part 3. When the screen part 3 of the notebook computer is lifted up, this cam may be pushed to move the guiding board 14 to make the key structure reaching a higher free height state of the key. Of course, in the application of this invention, there are many derivatives from the device of this press button 31, however, such kind variations are well known for the persons, who are familiar with this technology, so they are not described repeatedly here.

In summarizing the above-mentioned description, the elevated and lower keyboard apparatus provided by this invention, through a horizontally moving guiding board can make the key structure vertically lifted up and pressed down. It also makes that the keyboard of the notebook computer have a different height settings corresponding to an application state and a storage state and effectively reaching the requirement of the objects of the original design.

The above-mentioned preferable embodiments, applied to describe this invention in detail, however they are not the limitation for the field of this invention, and for the persons who are familiar with such technology may understand that an appropriate, minute change and adjustment still does not lose the merit of this invention and it is also within the spirit and the field of this invention.

In summarizing the above-mentioned description, the concreteness of the application of this invention really have already fulfilled the new model patent prerequisite regulated in the patent law. Sincerely please the esteemed review committee to examine these favorably, and the authorization of this patent is what we are humbly pray for.

What is claimed is:

1. A keyboard apparatus including an elevated and lower key structure, and comprising:
   a base;
   a first key-top-lid;
   a first scissors-device, which comprises a first connection rod and a second connection rod intersected to form a first turning scissors configuration, the first connection rod and the second connection rod each having an upper end, a lower end and a middle section, wherein the upper ends are connected to the first key-top-lid, the lower end is connected to the base, and the middle sections are pivotally connected between the upper and lower ends, the first scissors-device enabling the first key-top-lid to move up and down relative to the base;
   a second key-top-lid;
   a second scissors-device, which comprises a third connection rod and a fourth connection rod intersected to from a second turning scissors configuration, the third connection rod and the fourth connection rod each having an upper end, a lower end and a middle section, wherein the upper ends are connected to the second key-top-lid, the lower ends are connected to the base, and the middle sections are pivotally connected between the upper end and the lower end, the second scissors-device enabling the second key-top-lid to move up and down relative to the base; and a guiding board movably installed on the base and moveable between a first position and a second position, a first guiding block and a second guiding block being formed on the guiding board;

wherein, when the guiding board is moved from the second position toward the first position, the first guiding block and the second guiding block separately press upon the second connection rod and the middle section of the fourth connection rod, to make the first key-top-lid and the second key-top-lid move downward relative to the base, and when the guiding board is moved from the first position toward the second position, the first guiding block and the second guiding block separately release the second connection rod and the fourth connection rod, enabling the first and second key-top-lids to move upward relative to the base.

2. The keyboard apparatus of claim 1, further comprising first and second elastic bodies installed separately between the base, and the first and the second key-top-lids, respectively, such that, when the first and the second guiding blocks separately release the second connection rod and the fourth connection rod, through elastic forces of the first and second elastic bodies, the elastic bodies make the first and the second key-top-lids move upward relative to the base.

3. The keyboard apparatus of claim 1, wherein the guiding board is installed under the base, the first and second guiding blocks are installed on the guiding board, opening are formed in the base into which the guiding blocks are inserted, the guiding blocks extending through the openings and protruding upward through the base.

4. The keyboard apparatus of claim 1 further comprising at least one operation part having a first support frame, a second support frame and an elastic element, a first end of the first support frame is pivotally connected with the base, a first end of the second support frame is pivotally connected with the guiding board, a second end of the first support frame is pivotally connected with a second end of the second support frame, the elastic element is installed between the second support frame and the base, such that, when a force is applied on the operation part by a user, the elastic element is pressed down by the force, and the operation part rotates the first end of the first support frame around a fixed point, the first end of the second support frame is moved in the horizontal direction by the force, and the guiding board is moved from the second position to the first position, and, when the force is removed, a recovery force of the elastic element lifts the operation part to make the guiding board move from the first position to the second position.

5. The keyboard apparatus of claim 1, wherein the guiding board has at least two limited stop-blocks, the limited stop-blocks are elongated to accept the lower ends of the first and the third connection rods, whereby contact of the lower end of the connection rod to contact against the limited stop-block, limits the movement of the guiding board in the horizontal direction relative to the base.

6. A keyboard apparatus of a notebook computer, the notebook computer having a main body part and a screen part pivotally connected to and covered on the main body part, the keyboard apparatus is installed inside the main body part, and comprises:

a base;

a first key-top-lid;

a first scissors-device, which comprises a first connection rod and a second connection rod intersected to form a first turning scissors configuration, the first connection rod and the second connection rod each having an upper end, a lower end and a middle section, wherein the upper ends are connected to the first key-top-lid, the lower ends are connected to the base, and the middle sections are pivotally connected between the upper and lower ends, the first scissors-device enables the first key-top-lid to move up and down relative to the base;

a second key-top-lid;

a second scissors-device, which comprises a third connection rod and a fourth connection rod, and both connection rods are intersected to form a second turning scissors configuration, the third connection rod and the fourth connection rod each having an upper end, a lower end and a middle section, wherein the upper ends are connected to the second key-top-lid, the lower ends are connected to the base, and the middle sections are pivotally connected between the upper end and the lower ends, the second scissors-device enables the second key-top-lid to move up and down relative to the base;

a guiding board movably installed on the base and moveable between a first position and a second position, and at least one first guiding block and at least one second guiding block being formed on the guiding board;

wherein, when the guiding board is moved from the second position toward the first position, the at least one first guiding block and the at least one second guiding block separately press upon the second connection rod and the middle section of the fourth connection rod, to move the first key-top-lid and the second key-top-lid downward relative to the base, and when the guiding board is moved from the first position toward the second position, the first guiding block and the second guiding block separately release and second connection rod and the fourth connection rod enabling the key-top-lid to move upward relative to the base; and at least one operation part, movably connected to the guiding board and movable in a horizontal direction relative to the base.

7. The keyboard apparatus of a notebook computer of claim 6, further comprising first and second elastic bodies installed separately between the base, and the first and the second key-top-lids, respectively, such that, when the first and the second guiding blocks separately release the second connection rod and the fourth connection rod, through elastic forces of the first and second elastic bodies, the elastic bodies make the first and the second key-top-lids move upward relative to the base.

8. The keyboard apparatus of a notebook computer of claim 6, wherein the guiding board is installed under the base, the at least one first and second guiding blocks are installed on the guiding board, openings are formed on the base into which the at least one first and second guiding blocks are inserted, the at least one first and second guiding blocks pass through the opening and protrude upwardly through the base.

9. The keyboard apparatus of a notebook computer of claim 6, wherein the lower ends of the second and the fourth connection rods are formed as a turning, pivoting joint relative to the base, the upper ends are separately connected to the first and the second key-top-lid, such that, when the guiding board is moved from the second position toward the first position, the at least one first and the at least one second guiding blocks press upon the second connection rod and fourth connection rod, rotate the second and the fourth connection rod separately around axes of their lower ends, and makes the upper ends of the second and the fourth connection rods downward thereby moving the first and the second key-top-lids downward relative to the base.

10. The keyboard apparatus of a notebook computer of claim 6, wherein the operation part has a first support frame, a second support frame and an elastic element, a first end of the first support frame is pivotally connected with the base, a first end of the second support frame is pivotally connected with the guiding board, a second end of the first support frame is connected with a second end of the second support frame, the elastic element is installed between the second support frame and the base, the screen part has a contact-moving part, such that, when the screen part and the main body part are in a closed state, the contact-moving part presses against the operation part to compress the elastic element, the operation part takes the first end of the first support frame as a fixed point, the first end of the second support frame is moved in the horizontal direction by force from the elastic element, and moves the guiding board from the second position to the first position, and when the screen part is pivotally lifted up from the main body part, the contact-moving part separates from the operation part, and a recovery force of the elastic element lifts the operation part to move the guiding board from the first position to the second position.

11. The keyboard apparatus of a notebook computer of claim 6, wherein the guiding board has at least two limited stop-blocks elongated to accept the lower ends of the first and the third connection rods, whereby contact of the lower end of the connection rod against the limited stop-block, limits the movement of the guiding board in the horizontal direction relative to the base.

* * * * *